Feb. 5, 1924.                                                            1,482,774
C. H. WILLS
VALVE MOUNTING
Filed Nov. 3, 1920
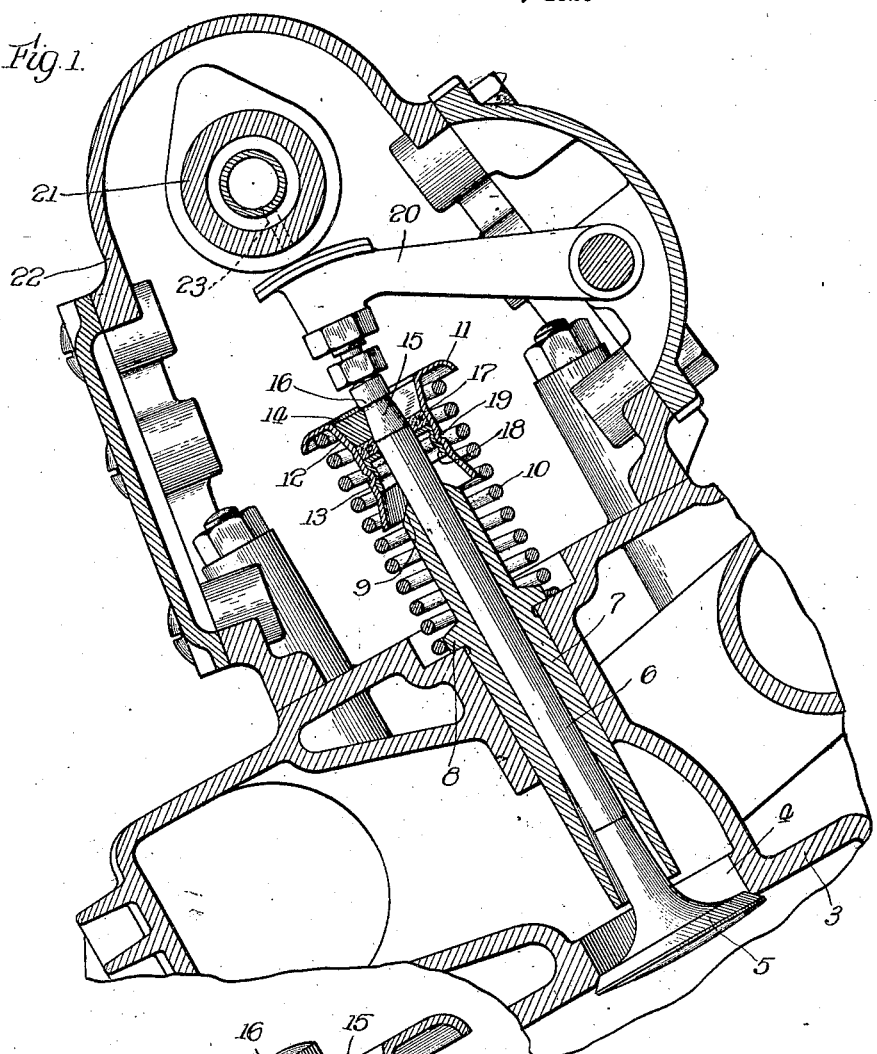
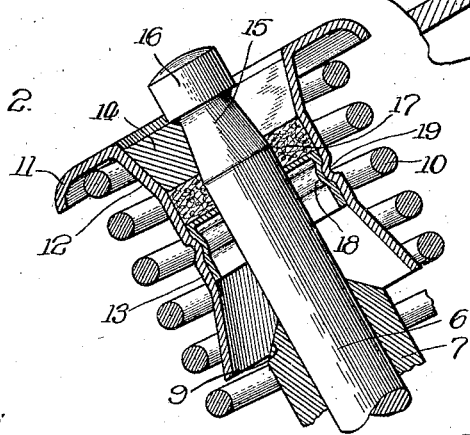
Inventor:
C. Harold Wills,
By Wilkinson Huxley Byron & Knight
Attys.
Witness:
A. J. Sauser.

Patented Feb. 5, 1924.

1,482,774

UNITED STATES PATENT OFFICE.

CHILDE HAROLD WILLS, OF MARYSVILLE, MICHIGAN.

VALVE MOUNTING.

Application filed November 3, 1920. Serial No. 421,551.

*To all whom it may concern:*

Be it known that I, CHILDE HAROLD WILLS, a citizen of the United States, residing at Marysville, in the county of St. Clair and State of Michigan, have invented certain new and useful Improvements in Valve Mountings, of which the following is a specification.

This invention relates to a new and improved mounting for valves and more specifically to a spring retaining assembly and valve guide adapted to be associated with the outer end of a valve stem of internal combustion engines.

In the valve stems of the usual types it is necessary to provide an annulus of some form attached thereto and adapted to receive the thrust of the spring tending to reseat the valve after its opening. The cams and tappets or followers associated with the valve stem must be kept properly lubricated, but any excess of oil working down to the valve faces is likely to cause carbonization often with pitting of the valve faces or unequal and incomplete seating of the valves. It is highly desirable therefore that means be provided adapted to prevent excess lubrication of the valve stem itself.

An object of the present invention is to provide a readily assembled and substantially oil tight connection between a valve stem retainer annulus and the valve stem with which it is associated. It is also an object to provide a device of this character which will compensate for wear and prevent looseness between the parts. It is a further object to provide a valve stem guide so formed as to prevent the passage of excess oil between the valve stem and the guide. Other and further objects will appear as the description proceeds.

The invention comprises a valve stem having a tapered portion adjacent its upper end, a valve spring retainer annulus being positioned adjacent the upper end of the stem and being retained in position with the stem by means of a wedge shaped annular washer. In the preferred form of the device, an oil excluding washer is located adjacent the wedge washer and is retained in place by a spring annulus. The upper end of the valve stem guide is beveled in order to have a shearing action to remove oil from the valve stem. The valve spring retainer annulus is formed with a skirt extending below the upper end of the valve stem guide, and thus tending to exclude oil from the valve stem.

I have shown a preferred embodiment of my invention in the accompanying drawings in which—

Figure 1 is a fragmentary view showing the valve assembly applied to a cylinder head; and, Figure 2 is an enlarged view of the assembly itself.

Referring to Figure 1, the cylinder head 3 is provided with a valve port 4 in which fits a valve 5 having a stem 6 extending upwardly. The valve stem 6 is guided by the sleeve 7 having the shoulder 8 resting upon the upper surface of the cylinder block, the upper edge of the sleeve being beveled at 9 and thus having an acute angled edge in engagement with the valve stem. The valve spring 10 surrounds the valve stem and valve stem guide, its lower end bearing against the upper surface of the cylinder block, and its upper end engaging the valve spring retainer annulus 11. The valve spring retainer annulus has an inwardly tapered portion 12 and a flared skirt 13 extending downwardly between the valve stem and the spring 10. The skirt 13 is flared outwardly so that its lower portion has a clearance from the valve sleeve 7 sufficiently large to prevent a pumping action between these parts in the operation of the valve. The wedge shaped split washer 14 is fitted against the wedge shaped portion 12 of the spring retainer annulus and its inner wedge shaped surface engages a tapered portion 15 of the valve stem, the washer fitting under a shoulder 16 on the valve stem. An oil excluding washer 17 preferably formed of cork is fitted against the under surface of the wedge washer 14, the cork washer serving to prevent oil working down past the faces of the split washer or through the split in the washer. The washer 17 is supported by a spring annulus 18 which is retained in place by a circumferential crimp 19 in the skirt of the annulus 11.

In Figure 1 this valve assembly is shown in association with a valve follower 20 and cam shaft 21 enclosed in a housing 22, the housing being fitted to the upper surface of the cylinder block. Lubrication is supplied to the parts through ports 23 in the cam shaft, the oil working downwardly over the follower and valve stem assembly. The wedge washer 14 and particularly the cork washer 17 serve to prevent oil working down along the valve stem. The depending skirt 13 of the valve spring retainer annulus 11 prevents excess oil being splashed against the intermediate portion of the valve stem, and any excess oil which may in any manner work upon the stem is removed by the shearing action of the beveled edge 9 at the upper end of the valve stem guide 7.

My valve stem mounting may be readily assembled, the guide sleeve 7 being first inserted in the cylinder head from above and the valve stem 6 then being passed upwardly through the sleeve from below. The spring 10 is next placed about the sleeve and valve stem, and the spring retainer annulus 11 with the washer 17 and spring annulus 18 assembled therein is forced down from above. The wedge washer 14 is then pressed in place, and its engagement under the shoulder 16 on the valve stem serves to retain the parts effectively in assembled relation.

It is thus seen that my invention is simple in construction and may be readily and easily assembled. It is, moreover, effective in operation and is efficient in the exclusion of excess oil from the valve stem.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

1. A valve stem, a valve spring retaining annulus associated therewith, means adapted to retain the stem and annulus in predetermined relation and a washer interposed between the stem and annulus and adapted to prevent passage of oil.

2. A valve stem, a valve spring retaining annulus associated therewith, means adapted to retain the stem and annulus in predetermined relation and a cork washer interposed between the stem and annulus and adapted to prevent passage of oil.

3. A valve stem, a valve spring retaining annulus associated therewith, means adapted to retain the stem and annulus in predetermined relation and a washer interposed between the stem and annulus and adapted to prevent passage of oil, a circumferential crimp formed in the spring retaining annulus and a washer retaining annulus held in place by said crimp and adapted to coact with the oil stop washer.

4. A valve stem, a valve stem guide, and a valve spring retaining annulus operatively associated with the valve stem, a depending portion of the annulus overlapping the outer end of the valve stem guide.

5. A valve stem, a valve stem guide, and a valve spring retaining annulus operatively associated with the valve stem, a depending portion of the annulus overlapping the outer end of the valve stem guide, the depending portion having sufficient clearance from the valve stem guide to prevent a pumping action therewith.

6. A valve stem, a valve stem guide, and a valve spring retaining annulus operatively associated with the valve stem, a depending portion of the annulus overlapping the outer end of the valve stem guide, the depending portion being flared outwardly to provide a substantial clearance from the valve stem guide.

7. A valve stem, a valve spring retaining annulus associated therewith, means adapted to retain the stem and annulus in predetermined relation and a washer interposed between the stem and annulus and adapted to prevent passage of oil, a valve stem guide surrounding the valve stem, the outer end of the guide being beveled, the bevel being such that an acute angle is formed adjacent the valve stem adapted to shear excess oil from the stem during its reciprocation.

8. A valve stem, a valve spring retaining annulus associated therewith, means adapted to retain the stem and annulus in predetermined relation and a washer interposed between the stem and annulus and adapted to prevent passage of oil, a valve stem guide surrounding the valve stem, a depending skirt portion of the annulus overlapping the outer end of the guide, the outer end of the guide being beveled, the bevel being such that an acute angle is formed adjacent the valve stem adapted to shear excess oil from the stem during its reciprocation.

Signed at Marysville, Michigan, this 19 day of October, 1920.

CHILDE HAROLD WILLS.